United States Patent [19]

Fujimoto et al.

[11] Patent Number: 4,693,918
[45] Date of Patent: Sep. 15, 1987

[54] TOOL FOR FIRING CERAMICS

[75] Inventors: Masashi Fujimoto; Yoshihisa Kato, both of Kariya, Japan

[73] Assignee: Toshiba Ceramics, Ltd., Tokyo, Japan

[21] Appl. No.: 844,563

[22] Filed: Mar. 27, 1986

[30] Foreign Application Priority Data

Aug. 9, 1985 [JP] Japan ................................. 60-174043

[51] Int. Cl.$^4$ .......................... B32B 1/02; F27B 14/08
[52] U.S. Cl. .................................... 428/35; 428/311.5; 428/317.9; 428/318.6; 428/319.1; 432/156; 432/248; 432/249; 156/DIG. 83

[58] Field of Search ............... 428/311.5, 319.1, 317.9, 428/318.6, 35; 156/DIG. 83; 373/156; 432/156, 248, 249

[56] References Cited

U.S. PATENT DOCUMENTS 3,930,085 12/1975 Pasiuk ........................... 428/319.1 X Primary Examiner—Alexander S. Thomas
Attorney, Agent, or Firm—Schwartz, Jeffery, Schwaab, Mack, Blumenthal & Evans

[57] ABSTRACT

A tool for firing ceramics such as a setter and crucible comprises a ceramic foam body which has a three-dimensionally reticulated structure comprising plural interconnected ceramic strands, and a ceramic setting layer formed on at least one part of the surface of the ceramic foam body.

15 Claims, 9 Drawing Figures

TOOL FOR FIRING CERAMICS

BACKGROUND OF THE INVENTION

This invention relates to a tool for firing ceramics such as a setter and crucible, which is used for a firing furnace. In particular, this invention relates to a tool comprising ceramic foam.

Conventionally, a variety of tools are used in a ceramic firing furnace, such as a tool formed entirely of refractories or a light-weight tool. The tool formed entirely of refractories is produced by forming refractories such as alumina, silicon carbide or zirconia and firing the formed refractory. The tool has a high bulk density of from 2.0 to 4.0, so that the thermal capacity is large and the heating efficiency of the firing furnace deteriorates. On the other hand, in order to reduce the weight of the tool, a light-weight tool is proposed as described in Japanese Published Patent Application No. 59-88378. The light-weight tool comprising refractory and ceramic fiber has a low bulk density of lower than 1.0. However, the light-weight tool has the disadvantage of being poor in passage of hot air because the porosity is as low as from 40% to 50% and the pore diameter is smaller than 100 microns.

A ceramic foam is known, which is produced by merely impregnating a soft urethane foam with a ceramic slurry and firing, as described in Japanese Patent Publications No. 57-21507 and No. 51-27448 and in U.S. Pat. No. 3,090,094. However, the conventional ceramic foam has weak strength properties such as a bending strength of 5 kgf/cm$^2$ or less and a compressive strength of from 10 to 30 kgf/cm$^2$, so that the conventional ceramic foam cannot be used for a tool for firing ceramics which is required to have a high mechanical strength and a high heat resistance.

SUMMARY OF THE INVENTION

One object of the present invention is to provide an improved tool for firing ceramics. Another object of this invention is to provide a tool for firing ceramics which improves the heating efficiency and has a low bulk density.

According to this invention, a tool for firing ceramics comprises a ceramic foam body having a three-dimensionally reticulated structure comprising plural interconnected ceramic strands and a ceramics setting layer formed on at least on part of the surface of the ceramic foam body.

Further objects, features and advantages of this invention will become apparent from the description of preferred embodiments which follows when considered together with the attached figures of drawings.

DETAILED DESCRIPTION OF THE PREFERRED EMBODIMENTS

A method for manufacturing a ceramic foam, in particular with reference to FIGS. 1A to 1E, is carried out as follows:

First, a ceramic slip is prepared. A starting material is compounded of small particles, the size of which are from about 0.1 to 44 microns. The starting ceramic material is mixed with water and a rapid drying binder such as PVA by means of a ball mill so as to obtain a ceramic slurry or slip having a viscosity of from about 2 to 15 poise.

Figure 1A:
FIGS. 1A, 1B, 1C, 1D and 1E are cross-sectional views showing a series of steps of a method for manufacturing a ceramic foam and particularly a strand thereof according to this invention.

Also, a starting foam of predetermined shape is prepared. A soft urethane foam is suitable which has a three-dimensionally reticulated urethane structure composed of many interconnected strands. FIG. 1A shows a cross-section of one strand 1 thereof.

Figure 1B:
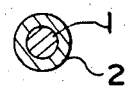

As FIG. 1B shows, a first ceramic layer 2 is formed on the urethane strand 1 by impregnating or infusing the urethane foam so as to coat the strand 1 of the urethane foam with the slip.

Surplus slip 1 is removed. The impregnated foam is dried at a temperature of from about 50° to 100° C. sufficient to become hardened.

Figure 1C:
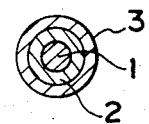

Next, as shown in FIG. 1C, a second ceramic layer 3 is formed on the first ceramic layer 2 by impregnating the foam and coating the first layer 2 with the slip. At this time, also, surplus slip is removed. The foam is again dried to hardness as in the case of the first layer 2.

Figure 1D:
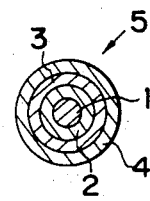

In addition, as shown in FIG. 1D, a third layer 4 is formed on the second layer 3 by impregnating the foam so as to coat the second layer 3 with the slip. Surplus slip is removed. The foam is dried to hardness in the same way as the second layer 3.

Figure 1E:
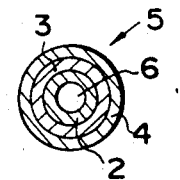

Finally, the strands 5 consisting of the starting urethane foam 1 and the ceramic layers 2, 3 and 4 thereon are fired at a high temperature of about 1500° C. or more. As a result, the ceramic layers 2, 3 and 4 become a porcelain ceramic multi-layer in the form of a ceramic strand 5 as shown in FIG. 1E. Many such ceramic strands 5 are interconnected to constitute a three-dimensionally reticulated ceramic structure which is structured as the starting foam. At the same time, the urethane strand 1 disappears on firing, to thereby leave an opening 6 in a central portion of each strand 5.

The resultant ceramic foam has a bulk density of from about 0.4 to 2.0, a compressive strength of from about 50 to 100 kgf/cm$^2$ and a bending strength of from about 10 to 35 kgf/cm$^2$. The void ratio thereof is from about 80 to 90% and the pore size is from about 0.5 to 4 mm.

In this invention, the bulk density of the ceramic foam may be set so as to have a value of from about 0.4 to 2.0 by adjusting the thickness of the ceramic multi-layer of the strand 5. If the bulk density of the ceramic foam is less than about 0.4, the ceramic foam fails to exhibit a satisfactory strength so that it is sometimes broken prior to use or in use. If the bulk density is more than about 2.0, the void ratio is decreased too much so that the heat efficiency is deteriorated. Further, the ceramic foam in this invention preferably has the bulk density of from about 0.7 to 1.5.

The ceramic slip is a slurry of ceramic materials such as alumina ($Al_2O_3$), silicon carbide (SiC), zirconia ($ZrO_2$), and alumina-zirconia ($Al_2O_3$-$ZrO_2$) dispersed in water or alcohol containing an organic binder such as polyvinyl alcohol (PVA) or phenolic resin. In the case of alumina, preferably the particle size should be from about 0.1 to 10 microns, and the average particle size should be from 1 to 10 microns. Also, PVA is preferably used as an organic binder. In the case of silicon carbide, preferably the particle size should be smaller than about 44 microns, and the average particle size should be from about 1 to 10 microns. Also, methyl cellulose is preferably used as an organic binder. Further, the firing should be carried out at a temperature of at least 2000° C. in a reducing atmosphere. In the case of zirconia, preferably the particle size should be smaller than about 44 microns, and the average particle size should be from about 1 to 10 microns. Also, about 3% by weight of magnesia is preferably used as a stabilizer. Further, the firing should be carried out at a temperature of at least 1500° C. in an oxidizing atmosphere. In the case of alumina-zirconia, preferably the composition should be from about 70 to 95% by weight of alumina and from about 5 to 30% by weight of zirconia.

In this invention, the ceramic layer of the strand may be a two layered structure or a structure having four or more layers. Further, if the ceramic foam has a satisfactory strength, the strand may be constituted by a single layer. Also, in the case of the multi-layer structure the strand may be constituted by plural layers made of different compositions or having different particle sizes.

Preferred ceramic foam materials are described in copending U.S. application Ser. Nos. 807,955 and 807,956, the disclosures of which are hereby incorporated by reference.

Figure 2:
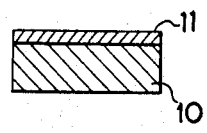
FIGS. 2, 3, 4 and 5 are cross-sectional views showing examples of the tools for firing ceramics according to this invention.

According to this invention, a ceramic setting layer is formed on at least one part of the surface of ceramic foam body. For example, the surface of ceramic foam body 10 is coated with a thickness of from about 1 to 10 mm of ceramic layer 11 as shown in FIG. 2. The ceramic layer 11 preferably comprises the same material as the ceramic foam body 10 so as to prevent peeling of the ceramic layer 11 due to the difference of the thermal expansion coefficient between the ceramic layer 11 and the ceramic foam body 10. The ceramic layer 11 may be applied repeatedly with a ceramic slip having a viscosity of from about 20 to 60 poise until the desired thickness is achieved. The coating is carried out before the ceramic foam body 10 is fired, and then the coated body is dried and fired.

Figure 3:
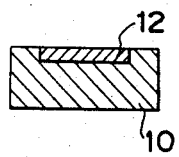

As shown in FIG. 3, a concave is formed on the surface of the ceramic foam body 10 in the form of a setter, and a light-weight layer 12 may be fitted into the concave. The light-weight layer 12 is produced, for example, by mixing refractory materials and ceramic fibers with water and amorphous silica and suction-forming the mixture and then firing the formed body.

Figure 4:
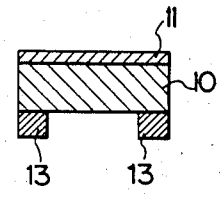

Also, as shown in FIG. 4, supports 13 may be set up on the lower surface of the ceramic foam body 10 in the form of a setter having the ceramic layer 11 as shown in FIG. 2. The supports are preferably made of the same ceramic foam as the ceramic foam body 10.

Figure 5:
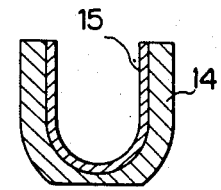

Further, FIG. 5 shows an example of the tool for firing ceramic powder. The tool is formed in the shape of a crucible and is coated on the internal surface of the ceramic foam body 14 with the ceramic setting layer 15 formed by applying a ceramic slip.

The tool for firing ceramics in this invention has the following excellent effects in comparison with the conventional tool.

(1) The ceramic foam body has a high void ratio of from about 80% to 90% and a pore size of from about 0.5 to 4 mm so that hot air can be passed through the ceramic foam body easily and the heating efficiency is extremely improved.

(2) The ceramic foam body has a low bulk density of from about 0.4 to 2.0 which is from about one half to one quarter of that of the conventional refractories, so that the thermal capacity of the tool is reduced and the heat efficiency is extremely improved.

(3) The tool for firing ceramics can be easily produced in various forms.

This invention will be more clearly understood with reference to the following examples:

EXAMPLE 1

A starting ceramic material comprised of 98% by weight of alumina was mixed with water and PVA by a ball mill so as to obtain a ceramic slip having a viscosity of 8 poise. The ceramic material was composed of small particles, sizes of which were between 0.1 and 10 microns, and an average particle size of which is between 0.5 and 5 microns. Also, a soft urethane foam having a predetermined shape was prepared.

Next, a first ceramic layer was formed on the urethane foam strand by impregnating the urethane foam with the ceramic slip. Surplus slip was removed. The impregnated foam was dried to hardness at a temperature of about 90° C. Further, a second layer and third layer were formed on the first layer in the same way as the forming of the first layer.

On the other hand, a ceramic slip was prepared by mixing 98% by weight of alumina with water and PVA. The ceramic slip had a viscosity of 30 poise. Then, the ceramic slip was applied on the surface of the ceramic foam body in a thickness of 5 mm so as to produce a ceramic setting layer.

Finally, the ceramic foam body having the ceramic setting layer was fired at a temperature of 1700° C. As a result, the ceramic layers became a multi-layer porcelain ceramic strand, and the urethane foam disappeared on firing to leave a long opening in the central portion of each strand. At the same time, the ceramic setting layer was glazed on the surface of the ceramic foam body.

The ceramic foam body of the resultant tool had a bulk density of 0.7, a void ratio of 88% and a pore size of from 1.0 to 2.5 mm. Also, the bending strength was 23 kgf/cm$^2$, and the compressive strength was 68 kgf/cm$^2$.

Ceramic condensers and ferrite were fired in an electric firing furnace by using this tool. As a result, the power consumption was 320 kWh. In comparison, in the case of firing with a conventional tool made of refractories, the power consumption was 1000 kWh. Also, in the case of a conventional light-weight tool, the power consumption was 500 kWh. Accordingly, the tool in this invention is superior to the conventional tools in terms of the heating efficiency.

EXAMPLE 2

A starting ceramic material comprised of 80% by weight of alumina and 20% by weight of zirconia was mixed in the same way of Example 1. Also, a soft urethane foam having a concave on the surface was prepared. Then, the ceramic foam body having a multi-layer structure was produced in the same way as Example 1 and was fired at a temperature of 1700° C. The resultant ceramic foam body had a concave on the surface and exhibited a bulk density of 1.5, a void ratio of 86% and a pore size of from 1.0 to 2.5 mm. Also, the bending strength and compressive strength were 29 kgf/cm² and 83 kgf/cm².

A light-weight ceramic material comprising 15 parts by weight of alumina fiber, 85 parts by weight of alumina and 10 parts weight of amorphous silica was mixed with water so as to produce a ceramic slurry. Next, the ceramic slurry was formed by suction-forming and was fired at a temperature of 1600° C. As a result, a light-weight ceramic body was produced, which exhibited a bulk density of 1.6 and an apparent porosity of 55.1%. The light-weight ceramic body was located in the concave of the ceramic foam body as a ceramic setting layer so as to produce the tool for firing ceramics in this invention, e.g., as shown in FIG. 3.

Ceramic condensers and ferrite were also fired in an electric firing furnace by using this tool. As a result, the power consumption was 370 kWh and was superior to that of the conventional tool.

What is claimed is:

1. A tool for firing ceramics, comprising a ceramic foam body having a three-dimensionally reticulated structure comprising plural interconnected ceramic strands, and a ceramic setting layer formed on at least one part of the surface of the ceramic foam body, wherein each of said ceramic strands comprises plural ceramic layers.

2. A tool for firing ceramics according to claim 1, wherein said ceramic setting layer comprises a ceramic coating layer.

3. A tool for firing ceramics according to claim 2, wherein said ceramic coating layer comprises the same material as said ceramic foam body.

4. A tool for firing ceramics according to claim 1, wherein said ceramic setting layer comprises a light-weight layer comprising refractory material and ceramic fiber.

5. A tool for firing ceramics according to claim 1, wherein said ceramic foam body comprises alumina, silicon carbide, zirconia or alumina-zirconia.

6. A tool for firing ceramics according to claim 1, which is in the form of a setter.

7. A tool for firing ceramics according to claim 6, wherein said setter has supports.

8. A tool for firing ceramics according to claim 1, wherein said ceramic foam body has a bulk density of from about 0.4 to 2.

9. A tool for firing ceramics according to claim 1, wherein said ceramic foam body has a bulk density of from about 0.7 to 1.5.

10. A tool for firing ceramics according to claim 1, wherein said ceramic foam body has a void ratio of from about 80% to 90%.

11. A tool for firing ceramics according to claim 1, wherein said ceramic foam body has a pore size of from about 0.5 mm to 4 mm.

12. A tool for firing ceramics according to claim 11, wherein each of said ceramic strands comprises a hollow channel at its center.

13. A tool for firing ceramics according to claim 1, wherein said plural ceramic layers are of the same composition.

14. A tool for firing ceramics according to claim 1, wherein said plural ceramic layers are of different compositions.

15. A crucible for firing ceramics comprising (a) a ceramic foam body having a three-dimensionally reticulated structure comprising plural interconnected ceramic strands and (b) a ceramic setting layer formed on at least one surface of the ceramic foam body.

* * * * *